United States Patent

[11] 3,607,613

[72] Inventors Edmund M. Passmore
 Wilmington;
 Donald P. Wilde, Marblehead, both of Mass.
[21] Appl. No. 732,073
[22] Filed May 27, 1968
[45] Patented Sept. 21, 1971
[73] Assignee Sylvania Electric Products Inc.

[54] ELECTRICALLY CONDUCTIVE REFRACTORY BODIES
 2 Claims, No Drawings
[52] U.S. Cl. .................................................. 161/182, 156/89
[51] Int. Cl. ...................................................... B32b 9/04
[50] Field of Search............................................ 161/116, 117, 164, 182, 188; 156/89, 283; 117/21–24; 264/61, 58, 63; 106/286, 55, 57, 62; 252/516

[56] References Cited
UNITED STATES PATENTS

| | | | |
|---|---|---|---|
| 3,055,789 | 9/1962 | Gemmi.......................... | 161/182 X |
| 3,232,822 | 2/1966 | Bush.............................. | 161/182 |
| 3,252,827 | 5/1966 | Rose et al. ................... | 117/21 X |
| 3,367,811 | 2/1968 | Baer et al...................... | 156/89 |

*Primary Examiner*—William A. Powell
*Attorneys*—Norman J. O'Malley and Owen J. Meegan

ABSTRACT: A unitary electrically conductive refractory body is made by joining at least two such smaller bodies. A thin layer of refractory powder is first applied to the interface layer between the two bodies. Heat and pressure is then applied thereto to form the unitary body. The smaller bodies can be formed of an admixture of AlN, BN and $TiB_2$ and the refractory powder can be a transition metal boride, carbide or nitride.

ELECTRICALLY CONDUCTIVE REFRACTORY BODIES

BACKGROUND OF THE INVENTION

1. Field of the Invention

There is a constant search for new compositions or bodies that possess unexpected combinations of properties desirable in specific fields of use. The refractory bodies of the present invention possess certain combinations of properties and characteristics that render them of considerable value, and they offer good possibilities in a number of fields of use. Refractory bodies generally refer to those having melting points in excess of about 1500° C., and made of firmly bonded particles of inorganic compounds. However, their important characteristics as electrically conductive refractory bodies make them especially suitable in high temperature applications where electrical conductivity is a desired property. Such an application is the vapor deposition of metals, where the metal is evaporated from a heated boat, in vacuo, and deposited on an article therein.

2. Description of the Prior Art

Graphite is a well-known electrically conductive refractory material, and evaporating boats thereof have been used in the past, especially in the vacuum deposition of metals such as aluminum. However, owing to the very short operating life of these boats, easily corroded by molten aluminum at its vaporizing temperature, they are frequently protected by an outer coating of such materials as titanium carbide, hafnium carbide tantalum carbide and others, which are resistant to the corrosiveness of molten aluminum. This approach restricts performance to the inherent physical properties of the coatings used. For this reason, boats having these coatings have a useful life of only a few hours, even at relatively low vaporization rates. These limitations have made it impractical to consider commercial operations of continuous high speed, aluminum vapor coating processes in industry. Accordingly, vapor coating has usually been restricted to a batch, or semibatch type of operation.

More recent research has led to the conclusion that the inertness of boron nitride (BN) to liquid aluminum would make it an ideal material for the subject purpose.

The major difficulty with using boron nitride boats for the above purpose is that such boats, owing to the high electrical resistivity of boron nitride, have to be heated by an outside source. One method is the employment of a resistance-heated carbon container. Together, the boron nitride boat and the carbon container form a double crucible system. Although use of a double crucible has some merit, it has a major drawback. When the system is heated to the desired temperatures of about 1100° C. to 700° C., and aluminum is fed into the crucible, the metal may creep up and over the sides of the inner crucible onto the carbon crucible, and react to form aluminum carbide. When this happens, the carbon crucible tends to crack rapidly, thus breaking the electrical heating circuit. The equipment then must be shut down, and a new crucible has to be installed.

SUMMARY OF THE INVENTION

Articles which can be used for high temperature applications have been extensively researched. In general, such boats have been rather small, since the ingots of pressed material from which they are made are limited in size. Increasing the size of the presses from which the ingots are made is not a wholly satisfactory procedure in all cases. For example, if the length is much more than twice the diameter of the ingot, it has been found that the middle of the ingot is less dense than the ends. Thus the resistivity of the article changes along its length, and the resistance to corrosion is at a minimum in the center, where it is most needed for evaporation boats and related applications.

To avoid these problems, it has been found that two or more smaller bodies can be bonded together so as to form a large unitary body. Such bonding can be accomplished by placing a thin layer of transition metal borides or carbides between the two bodies to be joined and then hot pressing. The bodies to be joined should have smooth faces, and each should have the surface configuration of the other.

The bonding techniques can be used to extend or enlarge bodies of the same composition; however, bodies having different compositions can also be joined. For example, electrodes can be made so that one portion has high conductivity while another portion has less susceptibility to corrosion. When joining such bodies, however, the coefficient of expansion should be such that the bond will not split apart when the body is heated In the field of vapor deposition of metals, it is possible to form a conductive portion of a boat which will be attached to electrical contacts and bond to it a second portion having a cavity which is not readily corroded by the molten metal.

According to the present invention, the faces of the two pieces to be bonded are ground smooth, flat and parallel. One or both faces are then coated with a slurry of transition metal carbides, borides or nitrides to form a bonding layer. Preferably, the slurry is prepared by admixing finely divided (less than 325 mesh) material in alcohol. The bonding layer should be between about 1 and 20 mils in thickness. When coated, the matching faces are placed against each other and the assembly is placed in a graphite die. Pressure in the order of 1,000 to 10,000 p.s.i. is applied to the assembly while it is heated to temperatures between about 1,800° and 2,200° C. for a sufficient time to effectuate the bond. The bonded article is then cooled and can be used as needed.

DESCRIPTION OF THE PREFERRED EMBODIMENT

In an example of a pressed body made in accordance with this invention, two separate pressed bodies were joined in such a manner that the resultant body had substantially the strength and appearance of a unitary body. Joining two bodies together is particularly useful where the ratio of the length to thickness of the desired body greatly exceeds the ideal maximum for hot pressing operations. The process is also useful where a pressed body is desired, the length of which exceeds the capability of a particular hot pressing machine. Moreover, when fabricating a part which is subject to environmental gradients and therefore, should ideally be formed of different materials at different locations, they may be bonded together by the present process. An example of such a part is an aluminum extraction electrode, in which low electrical resistance is the dominant requirement at one end, whereas high resistance to corrosion is more important at the other end. For such applications, this invention provides a method of joining together separate pieces of either the same or compatible materials.

The process includes joining two or more pieces of refractory composites by the simultaneous application of heat and pressure to adjoining faces, which have been previously treated by coating with either TiC, $TiB_2$, ZrN or other transition metal carbides, borides and nitrides. The resulting joint is strong, sound and retains the desirable characteristics of the original material, in that it is refractory, electrically conductive, and resistant to attack by corrosive media such as molten aluminum.

Specific embodiments of the invention are provided by the following examples:

EXAMPLE I

Two pieces, each 1 inch diameter by 1 inch long, were machined from an intermetallic composite consisting of 50% $TiB_2$ and 50% BN This material was chosen because of its relatively high mechanical strength. The opposite faces were ground smooth, flat and parallel. One face of each piece was then coated with a thin layer, about 10 mils thick, of $TiB_2$ powder (less than 325 mesh) applied in the form of a slurry made by mixing powder with alcohol. The two pieces were then placed in a graphite die with the coated faces in contact, the assembly was heated in vacuum to 1,900° C. and held for 2 hours under a pressure of 5,000 p.s.i. which was applied by means of graphite punches. After cooling, the bonded compact, which consisted of a round bar, 1 inch diameter by 2 inches long, was then sectioned into bend test specimens, each 0.100 by 0.250 by 2 inches. They were tested at room temperature using a 4-contact loading with a 1-inch gage length between center load contacts. Transverse bend strengths were calculated by means of the conventional formula, $S\ 3Pa/Wh^2$, where $P$— fracture load, $a$ — moment arm, $W$— width, and $h$— thickness. The results are summarized as follows:

| No. of Tests | 12 |
| --- | --- |
| Mean strength | 20,350 p.s.i. |
| Range of Strengths | 16,350–24,200 p.s.i. |
| Standard Deviation | 2,400 p.s.i. |
| Standard Error the the Mean | 790 p.s.i. |
| % Fractures at Bond Line | 58 |

The high strengths of the bonds are emphasized by the fact that fracture at the bond lines was not general.

Further manifestation of the high bond strengths is provided by comparison of the above with equivalent data for the intermetallic composite itself, not subjected to the heat, vacuum and pressure employed in the bonding process, which enhanced the basic strength of the material. Such data are as follows:

| No. of Tests | 9 |
| --- | --- |
| Mean Strength | 18,840 |
| Range of Standard | 14,300–22,140 |
| Standard Deviation | 2,640 |
| Standard Error of the Mean | 880 |

It can be seen that from the above data that the bond strength exceeds the original strength of the base material.

EXAMPLE II

In another example of the invention TiC was employed as the bonding material. This may be utilized where its darker color (compared to $TiB_2$) and thus more obvious bond line is not objectionable. The procedure was identical to that employed in the previous example with the exception that TiC powder (less than 325 mesh) was used to coat the adjacent faces. The bend test results were:

| No. of Tests | 11 |
| --- | --- |
| Mean Strength | 22,350 |
| Range of Strength | 15,700–27,300 |
| Standard Deviation | 3,650 |
| Standard Error of the Mean | 1,100 |

From the above results, it is evident that TiC provides an even stronger bond than does $TiB_2$, although either material may be employed to obtain the benefits of this invention.

EXAMPLE III

Another embodiment is provided by the following example in which evaporation sources for Al were made from a refractory intermetallic billet consisting of 45.0% $TiB_2$, 22.5% BN and 32.5 AlN. The billet was made by assembling three pieces, each 2¾ inches diameter and initially vacuum hot pressed to a density of 2.5 g./cc. (75% ideal ) at 1,800° C. for 3 hours under a pressure of 1,000 p.s.i. The adjoining faces were then ground flat and smooth, coated with an alcohol base slurry of −325 mesh TiC powder, and assembled with an overall length of 7⅝ inches in a graphite die. The assembly was then vacuum hot pressed to a density of 3.0 g./cc. (90% ideal) at 2,000° C. for 3 hours under a pressure of 3,000 p.s.i. The resulting billet had overall dimensions of 2 13/16 diameter by 5 1/2 inches long and was completely bonded into a sound monolithic mass.

The billet was then sectioned into eight evaporation boats, having overall dimensions of ½ by ¾ by 5 inches, which were then used in vacuum depositing aluminum in an apparatus similar to that previously described.

We claim:
1. A unitary electrically conductive refractory body comprising at least two refractory bodies integrally joined by an interface layer of a powdered refractory metal selected from the group consisting of transition metal borides, carbides and nitrides, said layer being about 1 to 20 mils thick, said refractory bodies comprising an admixture of boron nitride and titanium boride.

2. The refractory body of claim 1 wherein said refractory bodies comprise an admixture of aluminum nitride, boron nitride and titanium boride.